United States Patent
Cutler et al.

[15] 3,672,026
[45] June 27, 1972

[54] APPARATUS FOR DEVELOPING WOUND COILS FOR ELECTROMAGNETIC DEVICES

[72] Inventors: Arthur S. Cutler, Elnora, N.Y.; Dallas F. Smith, Fort Wayne, Ind.

[73] Assignee: General Electric Company

[22] Filed: May 11, 1970

[21] Appl. No.: 36,245

Related U.S. Application Data

[63] Continuation of Ser. No. 839,742, April 2, 1969, abandoned, which is a continuation-in-part of Ser. No. 594,463, Nov. 15, 1966, abandoned.

[52] U.S. Cl. ............................29/205 R, 29/596, 29/605, 29/606, 140/92.1, 242/7.09, 242/82
[51] Int. Cl. .......................................................H02k 15/00
[58] Field of Search...................29/596, 605, 606, 205 R; 140/92.1, 92.2; 242/82, 79, 7.09

[56] References Cited

UNITED STATES PATENTS

| | | |
|---|---|---|
| 2,847,171 | 8/1958 | Keesee....................................242/82 |
| 2,929,179 | 3/1960 | George ................................242/82 X |
| 3,036,603 | 5/1962 | Moore....................................140/92.1 |
| 3,331,403 | 7/1967 | De Young.........................140/92.1 X |
| 3,415,292 | 12/1968 | Ericson..................................140/92.1 |
| 3,508,316 | 4/1970 | Hill......................................29/205 R |

Primary Examiner—John T. Campbell
Assistant Examiner—Carl E. Hall
Attorney—John M. Stoudt, Radford M. Reams, Ralph E. Krisher, Jr., Oscar B. Waddell and Frank L. Neuhauser

[57] ABSTRACT

Apparatus for developing electrical coil groups formed of a number of coils in a coil group-accommodating member for ultimate transfer into selected slots of a magnetic core. The coil group-accommodating member is supported adjacent a non-collapsible, longitudinally movable coil form in position to receive the coil group. The coils in each coil group are developed by winding turns of a given coil on the non-collapsible form and concurrently moving some of the turns from the form into the accommodating member where the individual coil groups are finally developed. The non-collapsible coil form is periodically moved longitudinally to produce coils of differing spans during the development of each coil group.

22 Claims, 6 Drawing Figures

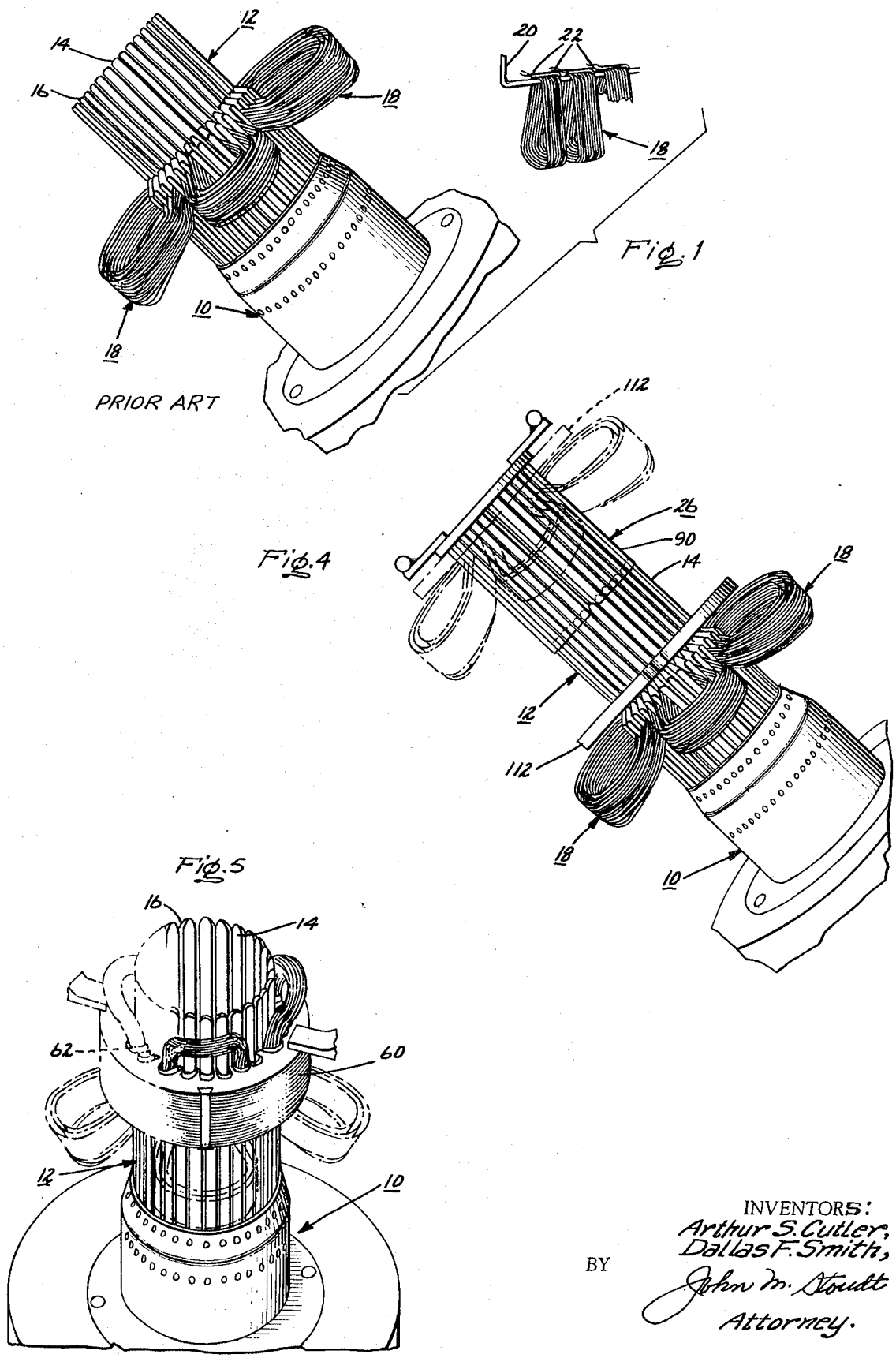

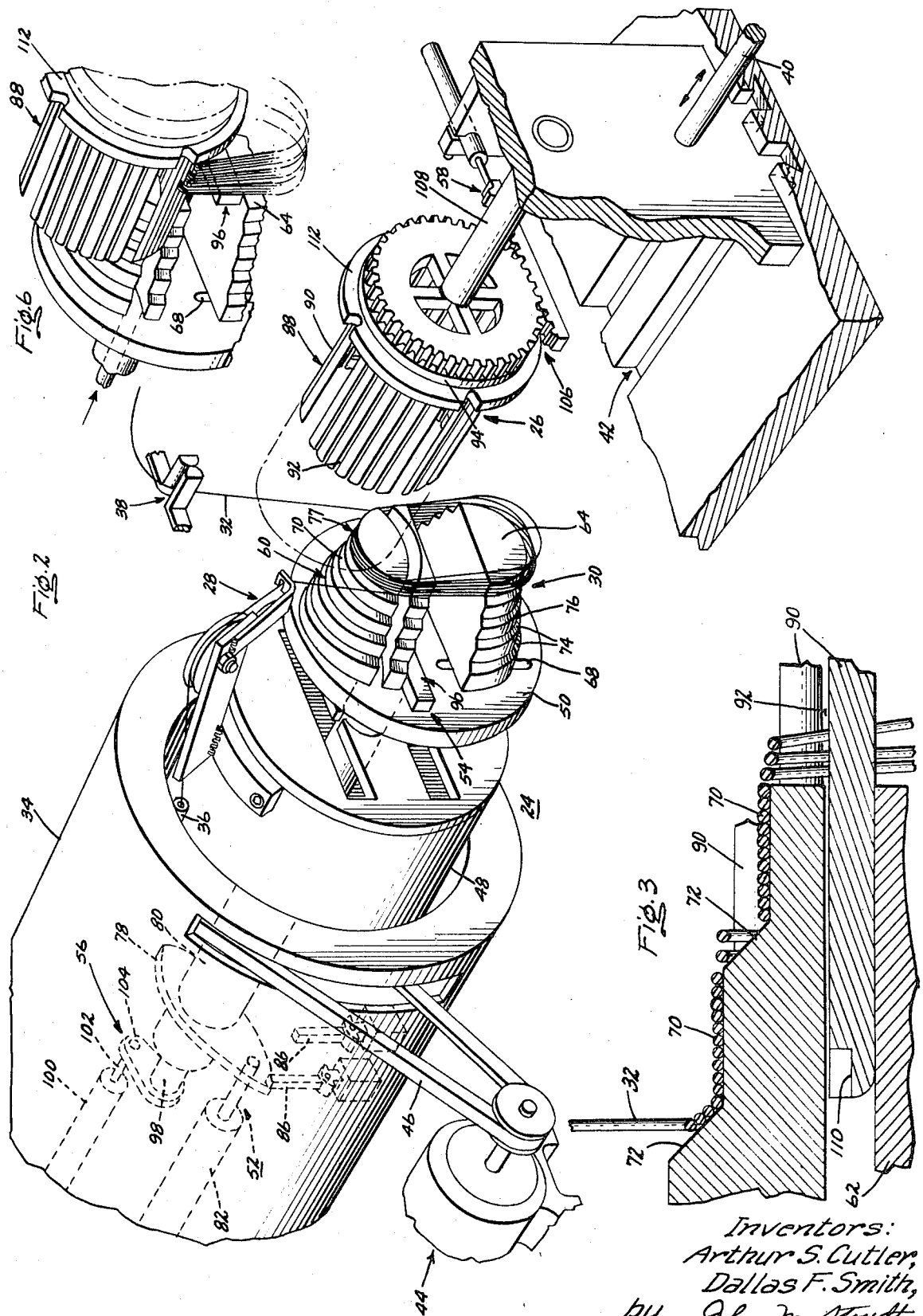

APPARATUS FOR DEVELOPING WOUND COILS FOR ELECTROMAGNETIC DEVICES

CROSS-REFERENCE TO RELATED APPLICATION

This is a continuation of copending U.S. application, Ser. No. 839,742 filed Apr. 2, 1969, now abandoned, which, in turn, is a continuation-in-part of U.S. application, Ser. No. 594,463 filed Nov. 15, 1966, copending therewith, now abandoned.

BACKGROUND OF THE INVENTION

This invention relates generally to improved apparatus for developing wound coils for use in electromagnetic devices. More particularly, the disclosure relates to improved apparatus of forming a plurality of interconnected coil groups into a coil group-receiving assembly for ultimate transfer into a stator core.

The basic method used to insert or inject coils axially into magnetic cores, such as stator cores, is exemplified in the expired U.S. Pat. No. 2,432,267 to A. P. Adamson. The apparatus for injecting coils has been continuously improved of course since this method was originally introduced. One such improvement was the well-known coil injection machine which enables coils and/or coil groups to be placed axially in the slots of stator cores.

Since the coil injection machine is not a winding machine, the coils used therewith must somehow be wound into appropriate coil groups and loaded into the machine prior to injection of the coils into certain slots of the stator cores. In one approach, coils of a particular coil group are wound on a collapsible arbor type winding machine, often with coil groups wound all in one direction in a pole-by-pole fashion. In this kind of machine, after the coil group has been wound on the arbor, the arbor is collapsed into a smaller cross-sectional configuration to permit removal of the coils individually from the machine. These coils are then inserted into slots of the core by the coil insertion machine. Prior approaches included one or more of the following which detract from the efficient and economical development of coils with consistent quality and tend to limit the satisfactory production of the coil injection procedure: collapsing type arbor winding machines; removal of the coils from the machine by an operation such as by hand; and unusually long wire connections between coil groups and polarity of the groups, among others.

SUMMARY OF THE INVENTION

Accordingly, it is a general object of this invention to provide an improved apparatus for developing wound coils for electromagnetic devices.

Another more specific object of the invention is the provision of apparatus for developing interconnected coil groups in coil-placing machines for subsequent insertion into a magnetic core which overcome at least some of the difficulties mentioned above.

Another object of the present invention is to provide a novel apparatus for developing wound coil groups into a transfer device for subsequent loading of the coil groups into the tooling section of a coil injection type machine.

In carrying out the invention in one form, we provide novel apparatus which may be employed to facilitiate the development of wound coils. In the illustrated exemplification, the apparatus has a non-collapsible split coil form, including a plurality of different size coil turn-forming stations, supported for longitudinal movement with respect to a winding flyer, which rotates about the form to place turns of wire thereon. Concurrently, a coil group-receiving assembly, for example, a transfer magazine adapted to mate with the tooling section of a coil injection machine or the tooling section itself, is mounted adjacent the coil form to receive at least some of the coil turns as they are being generated about the coil form. Means is also provided for insuring the complete removal of all remaining coil turns from the coil form into the coil group-receiving assembly.

BRIEF DESCRIPTION OF THE DRAWINGS

The subject matter which we regard as our invention is particularly pointed out and distinctly claimed in the concluding portion of the specification. The invention itself, however, together with further objects and advantages thereof, may be best understood by reference to the following description taken in conjunction with the accompanying drawings in which:

FIG. 1 is a partial perspective view of a conventional coil injection machine of the type presently in use, designated as "Prior Art", showing the tooling section thereof and illustrating the manner in which it is loaded with coil groups preparatory to the insertion of the groups into the electromagnetic device, such as a stator in the illustrated exemplification;

FIGS. 2 and 6 are partial perspective views illustrating apparatus incorporating the preferred embodiment of our invention;

FIG. 3 is an enlarged partial vertical sectional view showing a portion of the coil form and coil group-receiving assembly in the form of a transfer magazine in the exemplification of this invention, illustrating one manner in which coils are formed in groups and transferred into the transfer magazine of the exemplification;

FIG. 4 is a partial perspective view illustrating one manner in which coil groups may be transferred from the magazine into the coil injection tooling section of the coil injection machine; and FIG. 5 is a partial perspective view illustrating the manner in which the coil groups are injected axially into the coil-receiving slots of a stator core.

DESCRIPTION OF THE PREFERRED EMBODIMENT

Having more specific reference now to FIG. 1, we have illustrated therein a coil injection machine 10 of a type well-known in the art, which has evolved from the Adamson invention set out in the above mentioned U.S. Pat. No. 2,432,267. The coil injection machine 10 includes a tooling section 12 having a plurality of upstanding blades 14 mounted in equally spaced apart relation in order to form a plurality of slots 16 therebetween and forming a generally cylindrical outer periphery. The configuration of the blades 14 permits a stator core to be supported on the tooling section 12 in accordance with the usual operation of the coil injection machine 10.

One well-known manner of loading the tooling section 12 of the coil injection machine 10 is to hand-load coil groups 18 therein. The coil groups 18 may be normally supported on a supporting means 20 adjacent the coil injection tooling section 12 in order to provide ready access thereto, enabling the operator to take the coil group from the supporting means 20, release the fastening clip or tape 22, and then proceed to manually locate the coil group in the tooling section 12. The coil groups 18 have been conventionally wound on a collapsing arbor type winding machine (not illustrated) in order to provide distributed, level or single layer wound concentric coils for use with the coil injection machine 10. However, since the coil groups are manually handled after removal from the winding arbor, the level wound configuration is often lost notwithstanding the use of the tapes or clips 22. Accordingly, it is often difficult for the operator to mount the coil groups in the tooling section 12, since the slots 16 are normally only wide enough to receive a single thickness of wire. Furthermore, the individual coils of each group of coils are wound in the same direction and hence alternate groups of coils must be reversed by the operator during loading of the tooling section 12. Other suggested procedures, among other problems, tend to form unnecessarily long so-called interpole connections, i.e., wire connecting different coil groups together in circuit, when the connections are made unitary (of the same continuous length of wire as the individual coil groups).

In order to provide a more efficient arrangement for loading the tooling section 12 of a coil injection machine and for producing adjacent coil groups of different polarities, integrally interconnected with relatively short, unitary interpole connections, we have provided the machine illustrated in FIG. 2 and generally denoted by reference numeral 24. We have illustrated in FIG. 2, for example, various aspects of one form of our invention in connection with a coil group-receiving assembly in the form of a four-pole transfer magazine 26 which is adapted to mate with the tooling section 12 of a conventional four-pole coil injection machine. As shown in FIG. 2, a winding flyer generally denoted by reference numeral 28 is utilized to wind about a stepped noncollapsing coil turn-forming means in the form of a coil form 30 a plurality of distributed, level wound concentric coils of different size from a continuous length of electrically conductive insulated wire 32. The wire is normally withdrawn from a wire source (not illustrated) running through the machine housing 34 in the wire tube 36 then into the winding flyer 28.

In order to wind the wire 32 about the coil form 30, the end of the wire is initially clamped in a suitable clamping means shown schematically at 38. After the wire 32 is clamped, the transfer magazine 26 is moved forwardly in the track 42 by suitable means 40 until it is in the position illustrated in FIG. 2 in phantom lines. The moving means 40 may be, for example, the piston of an air cylinder. When the magazine 26 is forward, it is immediately adjacent the forward end of the coil form 30 and is located in position to receive coil turns therefrom.

A plurality of serially connected, level wound concentric coil turns of different size are generated or sequentially placed on the coil form 30 by the winding flyer 28 as the winding flyer 28 rotates about the coil form 30. The winding flyer 28 is rotated by any standard reversible motor 44 which is connected by the belt 46 to a rotatable barrel 48 upon which the flyer 28 is mounted. The rotatable barrel 48 also supports the wire tube 36 and is mounted within the housing 34 for rotation with respect thereto. The coil form 30 is maintained stationary with respect to the rotatable barrel 48 in order to enable the turns of wire to be placed or generated on the coil form 30, the coil form 30 being mounted on the nonrotatable plate 50.

The concentric, different size coils comprising a coil group 18 are formed as the flyer 28 rotates about the form 30 by a stepping mechanism 52 which periodically moves the coil form 30 forwardly in the direction of the transfer magazine 26. This movement of the coil form sequentially locates the steps or coil turn-forming stations of the coil form in position to receive turns from the flyer. As the turns of wire are wound about the coil form, at least several turns of each coil are initially crowded off the form into the transfer magazine 26.

When a complete coil group 18 is formed upon the coil form 30, the flyer motion ceases and the remaining turns of the entire coil group 18 are moved off the form into the transfer magazine 26 by a stripper means 54, operative by a stripper actuating means 56. The coil form 30 is then withdrawn by the mechanism 52 to its initial position, and the transfer magazine is indexed or rotated by the indexing mechanism 58 in order to enable another coil group to be loaded therein.

A second oppositely wound coil group 18 is then generated from a continuous strand of wire on the coil form as the winding flyer 28 is rotated about the coil form 30 in a reverse direction by the motor 44 and the coil form 30 is again periodically stepped forwardly by the stepping mechanism 52. As the second group of coils is generated from the continuous strand of wire 32, it therefore is serially connected to the first group of coils. The turns of the second group of coils are moved from the coil form 30 into the transfer magazine 26 in the same manner as the first group, and the above procedure is repeated until a desired number of coil groups are formed and loaded in the transfer magazine 26.

When the transfer magazine is fully loaded, it is removed from the machine 24 and may then be mounted on the tooling section 12 of a coil injection machine 10 (FIG. 4), the serially connected coil groups being inserted directly into the tooling section 12. The empty magazine 26 is then removed from the tooling section 12, and a stator core 60 (FIG. 5) positioned on the tooling section and the coil groups are axially inserted into the coil-receiving slots 62 of the stator by the coil injection machine. The empty transfer magazine 26 may then be positioned on the machine 24 in order to have another set of coil groups developed therein.

There are several important advantages of the present invention, including the fact that the coil groups are not manually handled during the entire process of developing the coil groups and loading them in the tooling section 12 of the coil injection machine 10. Also, the turns are placed into a coil group-receiving assembly without need for a collapsible type winding form. These factors dramatically reduce the possibility of damaging the wire insulation or of disturbing the level winding of the coils while insuring short interconnections between coil groups. In addition, the coils of the group are developed and maintained in proper relationship for direct transfer into the coil injection machine, i.e., adjacent coil groups are oppositely wound to provide adjacent poles of alternating polarity.

In order to more fully explain how the above may be carried out in actual practice, we will now more fully describe the specific features of the preferred form of the machine 24 which may be used in the exemplification of the invention as shown in FIGS. 2 and 3. Initially, it will be observed that the stepped coil form 30 includes a first or upper portion 60, an intermediate portion 62 and a second or lower portion 64, each of which is mounted in cantilever fashion on the plate 50 and extends forwardly therefrom. The upper and intermediate portions 60 and 62 are fixedly mounted to the plate, defining therebetween an arcuate slot 66. The lower coil form portion 64, however, is adjustably mounted on the plate 50, the plate including an elongate slot 68 which enables the lower portion 64 to be vertically adjusted (as viewed in the drawings) with respect to the upper portion 60. This allows different size coils to be formed on the coil form 30, thereby enabling the machine 24 to be used for developing coils in stator cores of varying stack height.

Also, if desired, the individual turn lengths in a given coil could readily be varied merely by progressively changing the relative locations of the first and second portions during the generation of the turns for the given coil. For instance, second portion 64 may be attached to plate 50 such that it could be moved gradually toward or away from portion 60 by a screw-type feed. By controlling speed and direction of the feed and by providing shortened steps so turns are fed rapidly into the coil-receiving assembly, the turns would be progressively shortened, lengthened, or changed in length as desired in the same coil as the turns are being generated.

The upper coil form portion 60 includes a plurality of vertically displaced arcuate sections or steps 70 each of which has a common center of curvature which is substantially perpendicular to the plate 50. Thus, it will be appreciated that the arcuate steps 70 are all generally horizontal (as viewed in the illustrated embodiment). The arcuate steps or sections 70 are joined by inclined arcuate sections 72. The lower coil form portion 64 also includes a plurality of vertically displaced arcuate sections or steps 74, joined, as are the upper steps 70, by inclined arcuate sections 76. Corresponding pairs of upper and lower arcuate steps 70 and 74 are of equal length, and together with corresponding pairs of upper and lower inclined arcuate sections 72 and 76 define a plurality of coil or turn-forming stations 77 which are of increasing size from the forward end of the coil form 30 rearwardly. The intermediate coil form portion 62 includes stepped sides comprising a part of each coil-forming station 77. Although for convenience in manufacture the arcuate outer surfaces are made generally solid, they could, of course, be formed by components, such as pins or parts having axial slots to furnish interruptions in the surfaces.

We have provided the stepping mechanism 52 in order to sequentially locate the coil-forming stations 77 in turn-receiving position under the winding flyer 28. The mechanism 52 includes an elongate hollow supporting tube 80 having the mounting plate 50 fixed to the front end thereof. A yoke plate 78 is mounted at the rear end of the tube 80, and a double action air cylinder 82 has its piston 84 engaged with the yoke plate 78 in order to provide a constant force against the yoke plate 78. A plurality of solenoid actuated stops 86 extend into the path of the yoke plate 78 and prevent the cylinder 82 from moving it forwardly. The supporting tube 80 and the coil form 30 mounted thereon are moved forwardly in steps as the stops 86 are sequentially withdrawn allowing the air cylinder 82 to force the yoke plate 78 forwardly.

In accordance with one aspect of our invention, the stops 86 are spaced in order to sequentially locate the upper and lower inclined arcuate sections 72 and 76 of each coil-forming station in the winding path of the winding flyer 28. This has been done to provide a means for forming level wound coils without the necessity of moving the coil form continuously in the manner of known prior art devices. Thus, as the winding flyer 28 rotates about the coil form 30 to generate the turns forming a coil at each station, the wire 32 is placed about the upper and lower inclined arcuate sections 72 and 76, whereby succeeding turns of wire force preceding turns of wire forwardly onto the arcuate sections 70 and 74. In addition, each lower arcuate section 74 is preferably slightly inclined to enable the coils formed about each coil-forming section to slip therefrom as the succeeding turns force the preceding turns forwardly. In actual practice, it has been found for best results to have the common centers of curvature of the lower arcuate sections 74 intersect the plate 50 at an angle of approximately 85° and intersecting the common center of curvature of the upper arcuate sections 70 at an angle of approximately 5°. This (along with the fact that succeeding turns force preceding turns forwardly) enables some of the coil turns to be initially crowded off the form 30 into the coil group-receiving assembly, e.g. that illustrated, while each coil is being wound.

The transfer magazine 26 of the illustrated exemplification is constructed with a plurality of coil-receiving means therein for accommodating four coil groups. The magazine 26 includes a mounting plate 94 upon which is mounted a cage 88 including a plurality of longitudinally extending spaced apart blades 90 defining a plurality of elongate slots 92 therebetween. The blades 90 are mounted about the mounting plate 94 giving the cage 88 a generally cylindrical shape, corresponding to the shape of the arcuate slot 66 between the upper and intermediate coil form portions 60 and 62. The shape of the cage 88 permits the coil form 30 and the cage 88 to telescope, as shown in FIG. 3, as the coil form 30 is stepped forwardly by the stepping mechanism 52. Thus, as will be seen in FIG. 3, several of the blades 90 move into the arcuate slot 66 as the coil form and the magazine move in relation to one another, and the individual coils formed upon the various coil-forming stations 77 of the coil form 30 each move into opposed slots 92 of the magazine cage 88. If the coil group-receiving assembly is the tooling section of the coil injection machine, that section and form 30 should include this relationship. Furthermore, as explained above, the succeeding turns of the wire 32 force preceding turns forwardly on the coil form 30, and the coil formed at each coil-forming station 77 moves at least partially into its respective magazine slots 92 as it is wound. In addition, to insure that each of the coils is moved from the coil form fully into the magazine cage slots 92, the aforementioned coil stripper 54 is provided.

The coil stripper 54 includes a stripper head 96 mounted on the forward end of an elongate stripper rod 98 which extends through the supporting tube 80. The stripper actuating means 56 includes an air cylinder 100 having its piston 102 connected to a laterally extending yoke plate 104 mounted on the stripper rod 98. After a desired number of coils are formed on the coil form 30, and the coil form 30 and the magazine cage 88 are in telescoping engagement, the air cylinder 100 is actuated in order to move the stripper head 96 forwardly between the upper and lower coil form portions 60 and 64 thereby forcing the coils from the coil form 30 fully into the magazine cage 88.

After a first set of coils is moved by the stripper head 96 into the magazine cage 88, the air cylinder 82 is actuated to withdraw its piston 84 and hence move the supporting tube 80, the supporting plate 50 and the coil form 30 back to its initial position. At the same time, the transfer magazine 26 is indexed or rotated by any suitable means, such as the rack and pinion arrangement 106 on the magazine supporting arbor 108. The magazine is rotated through a preselected angle to locate empty magazine slots 92 in the proper coil-receiving position adjacent the coil form. As stated above, the flyer 28 is then rotated in the opposite direction by the reversible motor 44 in order to form a second coil group of opposite polarity on the coil form 30.

When the transfer magazine 26 is fully loaded with a predetermined number of coil groups, it is removed from its supported position on the arbor 108. The transfer magazine 26 which is illustrated in the exemplification is a four-pole transfer magazine, i.e., a magazine adapted to have developed therein four serially connected wound coil groups. It will be appreciated, however, that magazines which are particularly adapted to two-pole, six-pole or greater configuration may be loaded with coil groups by the machine 24. After being removed from the arbor 108, the loaded magazine 26 is mounted upon the tooling section 12 of a coil injection machine in order to transfer the coils developed therein in the machine 24 into the tooling section 12. In this regard, each blade 90 of the magazine cage includes a notch 110 therein, forming a seat for mating the magazine cage 88 with the coil injection tooling section 12. Thus, when the cage 88 is seated on the tooling section 12, each blade 90 is in radial and axial overlapping relation with a blade of the coil injection tooling section 12. In addition, a magazine stripper 112 is mounted in the magazine cage 88 behind the coils developed therein. The stripper is useful for pushing the coils from the transfer magazine cage 88 directly into tooling section 12 of the coil injection machine 10. The coils will readily slide from the cage 88 into the tooling section 12 as the slots 92 are aligned with the slots 16 when the magazine 26 is correctly mounted on the coil injection machine. That is to say, the magazine slots 92 are in complementary relation with the slots 16 to form continuous passageways for accommodating the coil sides. In addition, the overlapped blades form positive guide means for facilitating transfer of the coil groups from the magazine slots 92 into the slots 16.

Referring finally to FIG. 5, it will be seen that after the coil groups forming a complete stator winding having been loaded in the tooling section 12 of the coil injection machine 10 in accordance with one aspect of our invention, a stator core 60 is mounted on the tooling section 12, and the coil groups are subsequently injected axially into the coil-receiving slots 62 thereof in order to install the wound coils in the core.

From the foregoing description of the apparatus exemplifying our invention, it will be apparent that we have provided an efficient and economical operation for developing wound coils for electrical induction devices. In addition, it will be realized that the present invention is extremely versatile in nature and can be conveniently used in connection with a variety of winding types, core stack heights, wire sizes, and coil injection equipment. Furthermore, while we have disclosed the invention in connection with an axial type coil injection machine, and the invention is particularly advantageous to use with this type machine, it will be appreciated that the invention could also have application with other types of coil injection equipment.

It should be apparent to those skilled in the art that while we have shown and described what at present is considered to be the preferred embodiment of our invention in accordance with the Patent Statutes, changes may be made in the structure disclosed without actually departing from the true spirit and scope of this invention, and we therefore intend to cover in the following claims all such equivalent variations as fall within the invention.

What we claim as new and desire to secure by Letters Patent of the United States is:

1. Apparatus for developing coils comprising a coil form assembly including a vertically disposed mounting plate, an upper coil form portion affixed to said mounting plate and projecting forwardly therefrom, said upper coil form portion having an upper surface divided into a plurality of vertically displaced arcuate sections, said plurality of vertically displaced arcuate sections being joined by inclined arcuate sections adapted to have turns of wire wound thereon, said vertically displaced arcuate sections having a common center of curvature which is substantially perpendicular to said vertical mounting plate, and said inclined arcuate sections having centers of curvature which are generally parallel and which intersect the common center of curvature at an angle of approximately 45°, a lower coil form portion adjustably mounted on said mounting plate, said lower coil form portion being substantially coextensive with said upper coil form portion and having a lower surface divided into a plurality of vertically displaced arcuate sections corresponding to the plurality of vertically displaced arcuate sections of said upper coil form portion, the arcuate sections of said lower coil form portion having a common center of curvature intersecting said mounting plate at an angle of approximately 85° and intersecting said common center of curvature of said vertically displaced arcuate sections of said upper coil form portion at an angle of approximately 5°, said corresponding vertically displaced arcuate sections of said upper and lower coil form portions each comprising a winding station for forming a different size coil of wire; means for placing turns of wire on said inclined arcuate sections; a transfer magazine having coil-receiving means; and means located between said upper and lower coil form portions and movable longitudinally therebetween for transferring coils wound upon said winding stations into the coil-receiving means of said transfer magazine.

2. Apparatus for developing distributively wound coil groups of wire for use in an electromagnetic device, each coil group having at least two serially connected coils, the apparatus comprising in combination: a non-collapsing stepped coil form including a first portion having a plurality of arcuate steps of increasingly larger size and a second portion having a plurality of arcuate steps corresponding to the arcuate steps of said first portion, said first and second coil form portions being spaced to define slot means therebetween, means for placing turns of wire on pairs of corresponding arcuate steps of said first and second coil form portions thereby to form a plurality of serially connected coils of different size, a coil-receiving magazine supported adjacent said coil form, means for moving the magazine and the coil form relative to one another for locating a portion of said magazine in said slot means to receive at least some of the turns of the serially connected coils as other of the turns are being wound on said coil form, and means for transferring the coils fully into said magazine.

3. Apparatus for developing distributively wound coil groups of wire for use in an electromagnetic device, each coil group having at least two serially connected coils, the apparatus comprising in combination: a non-collapsing stepped coil form having a forward end including a first portion having a plurality of displaced arcuate steps of increasingly larger size as the first portion extends away from the forward end, joined by inclined arcuate sections adapted to have turns of wire wound thereon and a second portion having a plurality of arcuate steps corresponding to the arcuate steps of said first portion, said first and second coil form portions being spaced to define slot means therebetween, means for placing turns of wire on a plurality of pairs of corresponding arcuate steps of said first and second coil form portions thereby to form a plurality of serially connected coils of different sizes, a coil-receiving assembly supported adjacent said coil form, means for moving the coil-receiving assembly and the coil form relative to one another for locating a portion of said coil-receiving assembly in said slot means to receive at least some of the turns of the serially connected coils as other of the turns are being wound on associated inclined arcuate sections of said coil form.

4. The apparatus of claim 2 in which the inclined arcuate sections adapted to have turns of wire wound thereon have centers of curvature which are generally parallel and intersect a common center at an angle approximately 45°.

5. Apparatus for developing coils comprising a coil form assembly including a mounting plate, a first coil form portion affixed to said mounting plate and projecting forwardly therefrom, said first coil form portion having an outer surface divided into a plurality of displaced arcuate sections, said plurality of displaced arcuate sectons being joined by inclined arcuate sections adapted to have turns of wire wound thereon, said displaced arcuate sections generally having a common center of curvature, and said inclined arcuate sections having centers of curvature which are generally parallel and which intersect the common center of curvature, a second coil form portion mounted on said mounting plate, said second coil form portion being substantially coextensive with said first coil form portion and having an outer surface divided into a plurality of displaced arcuate sections corresponding to the plurality of displaced arcuate sections of said first coil form portion, the arcuate sections of said second coil form portion having a common center of curvature intersecting said mounting plate at a preselected angle, said corresponding arcuate sections of said first and second coil form portions each including a winding station for forming a different size coil of wire; means for placing turns of wire on said inclined arcuate sections; a coil-receiving assembly having coil-receiving means; and means located between said first and second coil form portions and movable longitudinally therebetween for transferring coils wound upon said winding stations into the coil-receiving means.

6. The apparatus of claim 5 having means for periodically indexing the coil-receiving assembly and coil form assembly relative to one another after a selected number of coils have been received in the coil-receiving assembly.

7. Apparatus for developing at least a coil of electrically conductive wire for use in a magnetic core, said apparatus including: coil turn-forming means having at least a first section defining the size of the turns formed and at least a second section inclined with respect to said first section; winding means for generating turns of wire about said second section so that previously generated turns move along said first section as subsequent turns are generated; and a coil group-receiving means having a plurality of spaced apart blades; said coil group-receiving means being positioned with predetermined blades adjacent said first section of said coil turn-forming means for receiving therebetween at least some of the previously generated turns as subsequent turns are generated.

8. Apparatus as set forth in claim 7 wherein: said coil turn-forming means has a plurality of coil turn-forming stations; each of said coil turn-forming stations having a first section and a second second section with said first section of each of said coil turn-forming stations defining a turn size different than said first section of other of said coil turn-forming stations, and including means for providing relative motion between said coil turn-forming means, said winding means and said coil group-receiving means for sequentially generating turns of wire at different coil turn-forming stations and receiving at least some of the turns previously generated at any coil turn-forming station between sequentially selected blades of said coil group-receiving means as subsequent turns are generated at that coil turn-forming station.

9. Apparatus as set forth in claim 7: further including stripper means effective to insure that any turns remaining on said coil turn-forming means at the completion of turn generation are moved to said coil group-receiving means.

10. Apparatus as set forth in claim 7 wherein said coil turn-forming means includes at least first and second spaced apart form portions; said first and second form portions together forming said first and second sections; said coil group-receiving means being positionable within the space between said first and second portions for positioning predetermined blades adjacent said first section.

11. Apparatus for developing at least a coil of electrically conductive wire for use in a magnetic core, said apparatus including: noncollapsible coil turn-forming means; winding means for generating turns of wire about said noncollapsible coil turn-forming means; and coil group-receiving means having coil-receiving slots adapted to be disposed in close proximity to said noncollapsible coil turn-forming means for receiving generated turns of wire to form at least a coil; said noncollapsible coil turn-forming means, said winding means and said coil group-receiving means being so formed and positioned relative to one another that said winding means generates turns of wire about said non-collapsible coil turn-forming means and at least some previously generated turns are received in the coil-receiving slots of said coil group-receiving means as subsequent turns are being generated.

12. Apparatus for developing at least a coil of electrically conductive wire for use in a magnetic core, said apparatus including: non-collapsible coil turn-forming means; winding means for generating turns of wire about said non-collapsible coil turn-forming means; and coil group-receiving means for receiving generated turns of wire to form at least a coil; said non-collapsible coil turn-forming means, said winding means and said coil group-receiving means being so formed and positioned relative to one another that said winding means generates turns of wire about said non-collapsible coil turn-forming means and at least some previously generated turns are received in said coil group-receiving means as subsequent turns are being generated, said non-collapsible coil turn-forming means further including a plurality of coil turn-forming stations, with each station defining a turn size different than other stations; said coil group-receiving means further including a plurality of spaced apart coil-receiving slots; and means for providing relative movement between said coil turn-forming means, said winding means and said coil group-receiving means for sequentially positioning said winding means and selected ones of said coil-receiving slots in alignment with selected ones of said coil turn-forming stations so that turns of wire are generated sequentially at selected coil turn-forming stations and at least some of the turns previously generated at each selected coil turn-forming station are received in corresponding slots in said coil group-receiving means as subsequent turns are generated at that coil turn-forming station.

13. Apparatus as set forth in claim 11 wherein said turn-forming means defines a slot and wherein said apparatus further includes stripper means movably mounted within said slot effective to insure that any turns remaining on said coil turn-forming means at the completion of turn generation are moved into coil-receiving slots of said coil group-receiving means.

14. Apparatus for developing at least one coil of electrically conductive wire in a coil group for use in an electromagnetic device, the apparatus comprising: first means for forming turns; second means in the vicinity of said first means for generating successive turns of wire about the first means; third means having spaces therein for accommodating the generated turns of wire; and fourth means for removably maintaining said first means and the spaces of said third means in a relative aligned position in close proximity relative to one another such that the third means is positioned with the spaces in alignment to receive at least some of the turns as subsequent turns are being generated about the first means and in a second relative position in which said first means and the spaces of said third means are no longer in close proximity.

15. Apparatus as set forth in claim 14 in which said fourth means removably maintains said first and third means in telescoping relation as the subsequent turns are being generated.

16. Apparatus for developing at least one coil of electrically conductive wire in a coil group for use in an electromagnetic device, the apparatus comprising: first means for forming turns including a plurality of adjacent stations for forming coils of different sizes; second means in the vicinity of said first means for generating successive turns of wire about the first means; third means for accommodating the generated turns of wire, and defining a number of spaces which are sequentially aligned with the different stations for receiving selected portions of the turns as subsequent turns are being generated about the first means, and fourth means for removably maintaining said first means and third means in close proximity relative to one another such that the third means is positioned to receive at least some of the turns as subsequent turns are being generated about the first means.

17. Apparatus for developing at least two coils of electrically conductive wire for use in a magnetic core, said apparatus including: coil turn-forming means having at least two axially spaced apart sections for defining turns of different sizes; said two spaced apart sections each respectively having portions defining first and second locations separated by an elongated area of generally uniform, transverse cross-sectional configuration; winding means for generating turns of wire about said coil turn-forming means in the vicinity of said first location of each section; and means for moving each turn longitudinally of said coil turn-forming means as it is generated so that previously generated turns are moved generally longitudinally in a direction from said first location toward said second location of each section as subsequent turns are generated.

18. Apparatus as set forth in claim 17 further including means for removing a completely generated coil longitudinally of said coil form means.

19. Apparatus for developing at least two coils of electrically conductive wire for use in a magnetic core, said apparatus including: a coil form having a distal end and a plurality of spacially separated steps for defining turns of different sizes; winding means; means for effecting relative motion between said winding means and said coil form, with said steps being sequentially placed in alignment with said winding means for generating turns of wire to produce coils of at least two different sizes; turn-receiving means disposed adjacent the coil form in alignment with the separated steps; said coil form being dimensioned so that previously generated turns move toward said distal end of said coil form for each step and selectively into the turn-receiving means as subsequent turns are generated to permit the turn-receiving means to hold coils of at least two different sizes.

20. Apparatus as set forth in claim 19 further including means for removing a completely generated coil over said distal end of said coil form.

21. Apparatus for developing a plurality of coil groups formed of electrically conductive wire material for use in an electromagnetic device and for sequentially receiving a first coil group after development thereof prior to developing at least a second coil group, the apparatus comprising: coil turn-forming means; winding means for generating turns of wire about said coil turn-forming means to provide the plurality of coil groups; a coil group-receiving assembly having a number of sets of angularly spaced apart coil-receiving slots for temporarily accommodating a plurality of coil groups in angularly spaced relation for ultimate insertion into a magnetic core of the electromagnetic device; means for maintaining a preselected set of spaced apart coil-receiving slots of the coil group-receiving assembly and coil turn-forming means in adjacent aligned relation such that the preselected set of slots is in position to receive directly the first coil group from said coil turn-forming means prior to developing at least the second coil group and for sequentially indexing at least one other set of angularly spaced apart coil-receiving slots and the coil turn-forming means into the adjacent aligned relation so that said at least one other set of slots is thereafter in position to receive directly at least the second coil group from said coil turn-forming means at an angularly displaced location in the coil group-receiving assembly from the first coil group for ultimate transfer from the coil group-receiving assembly into the electromagnetic device.

22. The apparatus of claim 21 in which the coil turn-forming means includes a plurality of adjacent steps for defining coils of different sizes in each coil group; and said means for maintaining sequentially maintains coil-receiving slots of each set in the adjacent aligned relation with the different steps to receive the coils of different sizes for each coil group.

* * * * *